April 27, 1965 J. R. LAW 3,180,751

METHOD OF FORMING A COMPOSITE ARTICLE

Filed May 26, 1961

INVENTOR.
JAMES R. LAW
BY Frank C. Parker
David E. Dougherty
ATTORNEYS

United States Patent Office 3,180,751
Patented Apr. 27, 1965

3,180,751
METHOD OF FORMING A COMPOSITE ARTICLE

James R. Law, Chili, N.Y., assignor to Bausch & Lomb Incorporated, Rochester, N.Y., a corporation of New York Filed May 26, 1961, Ser. No. 112,866
2 Claims. (Cl. 117—5.5)

This invention relates to a method of forming a composite article and more particularly to a method of forming a system of related predetermined shapes on a substrate.

In processes where it is desired to form relatively thin metal lines on a substrate, it is difficult to obtain satisfactory tolerances. One approach to this problem is to use light hardened emulsion type masks on metal films and etch a desired pattern. Light reactive emulsions or resists as they are sometimes referred to are commercially available for example, as KPR or Kodak Photo Resist. In many cases this method is satisfactory and accordingly it has met with a high degree of commercial success.

Difficulties arise however; where it is necessary to produce a thin line having a width of less than 0.005″. In some cases the etchant undercuts the resist by attacking the metal film from a side adjacent the resist protection, and removes the metal from underneath the mask. In other cases the metal coating is resistant to mild etchants and an effective etchant which will remove the metal will also remove the light hardened resist material.

Another method for forming thin lines on a metal coated substrate is to use cathodic sputtering techniques. According to conventional sputtering practice, an electric field is set up between electrodes and ionizes gas particles within a chamber. The positive ions thus formed are attracted toward the cathode and bombard the surface of a masked object which is placed on the cathode. At those areas where the mask does not cover the object the metalized portions are dislodged by the bombarding particles.

The sputtering methods are quite satisfactory for forming relatively thick lines however the difficulty and high cost of forming accurate metal masks with critical tolerances have made it difficult to produce satisfactory results in the production of relatively thin lines.

The present invention contemplates a novel method of forming a system of related predetermined shapes with accurate dimensions. According to the invention, a system of metallic shapes may be produced at a relatively low cost in conventional equipment. Furthermore, the method overcomes to a high degree the disadvantages and limitations of prior techniques.

The novel method disclosed herein has been found particularly effective in producing a reticle having metallic lines of nickel, or a nickel alloy such as an iron nickel chromium alloy. The method has been found to have an effect on copper although the effect is of a somewhat lesser degree than that found with nickel or nickel alloys. The method has some effect on chrome and aluminum films, however for producing reticles it has been found less practical to use these materials. The method may be extended to removing non metallic films such as an acid fuchsine dye or other organic dyes.

Briefly, the method for forming a composite article by removing a film of material from preselected areas on a surface of a body includes the step of covering the surface excluding those preselected areas with a mask. The masked body is placed relatively close to an anode and arranged between the anode and a source of electrons with the masked surface facing the source of electrons. The masked body is subjected to sub-atmospheric pressure and subjected to the action of an electric glow discharge whereby the film of material is removed from the preselected areas.

More particularly, a method for forming composite articles having metallic configurations thereon according to a preferred embodiment of the invention comprises the step of depositing a layer of metal on a substrate such as glass or $MgF_2$ in a conventional vacuum chamber. The metalized surface is covered with an emulsion type mask or photo resist such as KPR which is light hardened in selected areas. Since there are a number of commercially available resists which are suitable for this purpose, the composition of the resist forms no part of the invention. The unhardened emulsion is removed and the article is placed in a vacuum. The metal surface is placed near the anode and subjected to an electric glow discharge whereby the unmasked metal areas are removed therefrom. The electric glow discharge tends to further harden the emulsion which may be subsequently removed if desired by chemical means.

The theory of the operation is not completely understood, however; it appears that the anode repels the relatively heavy positive ions with sufficient force that any ions reaching the article are ineffective in removing the masked portions. The result is that the unmasked metal is removed and close tolerances are obtained. If the polarity is reversed and the article is place near the cathode, the ions bombarding the article remove both the unmasked and masked portions.

The invention will now be described in more detail in connection with the accompanying drawings, in which.

Figure 1:
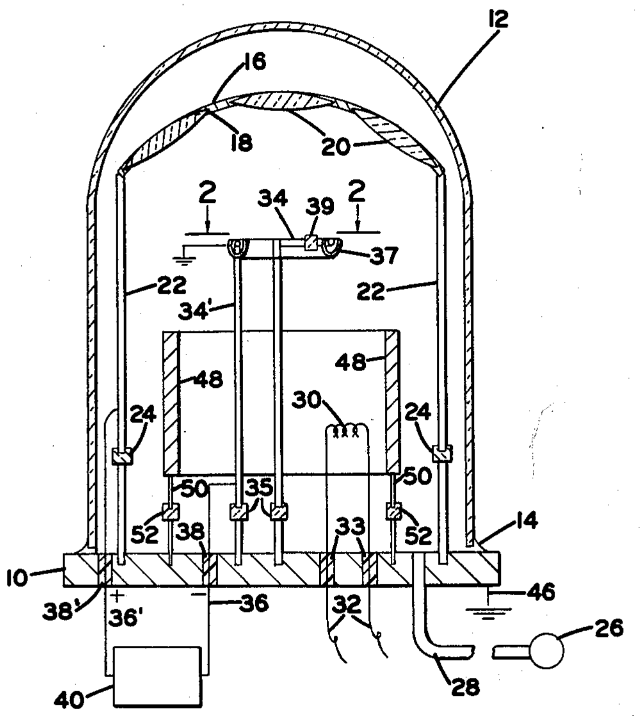
FIG. 1 is a side elevational view of an apparatus which can be used for practicing my method.
Figure 2:
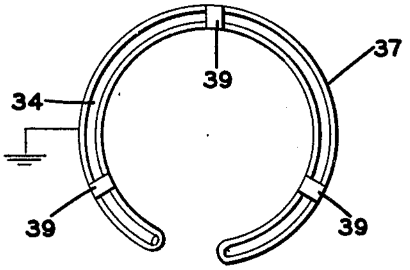
FIG. 2 is a top plan view taken along the line 2—2 in FIG. 1, showing a cathode structure used for practicing my method.

My method may be carried out in the apparatus shown in FIGS. 1 and 2 wherein a metal base plate 10 supports a glass or steel bell jar 12 with a gasket 14 therebetween. A work holder comprising a metal plate 16 with seats 18 therein for holding substrates 20 is mounted within the chamber. The metal plate 16 is supported by metal rods 22 which are electrically insulated from the base 10 by insulators 24. The bell jar may be evacuated by means of a vacuum pump 26 which is connected to the chamber by means of a conduit 28.

A heating coil 30 having leads 32 passed through nonconductive vacuum tight bushings 33 in the base 10 is adapted to support the material which is to be vaporized. In the preferred embodiment the material comprises loops of a nickel alloy. The leads 32 are connected to a source of electrical current so that the material may be heated and vaporized.

A ring filament 34 is placed in the chamber to provide a source of electrons for subjecting the substrates 20 to an electric glow discharge. The substrates 20 are normally bombarded prior to evaporating the material, and subsequent to the masking. The filament 34 is mounted on a pair of rods 34′ and insulated from the base 10 by insulators 35. The filament 34 is maintained at a negative potential by being connected to the negative side of a rectifier circuit 40 through the lead 36 which is insulated from the base 10 by the vacuum tight bushing 38. The high voltage rectifier circuit 40 has its positive terminal connected to the rod 22 by means of the lead 36′ which is passed through a bushing 38′ in the plate 10. The negative terminal which is connected through the leads 36 to the ring 34 supplies current to the electron emitting ring 34.

The rectifier circuit 40 delivers from 1 to 15,000 volts D.C. The positive terminal is connected to the rod 16 so that the work holder 16 and the substrates 20 are at a positive potential. The base plate 10 is connected to ground by a lead 46. A cylindrical metal shield 48 is supported on the rods 50 and insulated from the base by the insulators 52 to prevent the deposition of metal on the rods 22 and insulators 24.

For forming metallic lines it is desirable in this particular geometrical arrangement to maintain a potential of 3,000 to 4,000 volts and a pressure of 10 to 20 microns, during removal of the metallic film. An increase in voltage tends to reduce the area of the glow discharge thereby concentrating the glow near the center of the plate 16 resulting in a non uniform article.

The ring 34 may be replaced by a different structure for the glow discharge prior to deposition. The different structure (not shown) is desirable during deposition of the metal since it is undesirable to have any obstruction between a source of metal ions and the substrates 20. However, it has been found desirable during the metal removing process to have a ring structure similar to the one shown. The ring 34 extends into the upper region of the chamber and is therefore relatively close to the substrates during the removal step. It is also desirable to place a reflector 37 below the ring filament 34. The reflector 37 is mounted on the ring 34 by means of insulators 39 and is grounded.

In one method of practicing our invention the substrates 20 are mounted on the metal holder 16 and the chamber is evacuated to a pressure of about 10 microns of mercury. The rectifier circuit 40 is energized so that a potential of about 3,000 to 5,000 volts is applied to the holder 16. The ring filament 34 is also energized so that electrons therefrom bombard the surfaces of the substrates 20. After the filament 34 has been energized for a sufficient length of time, the pressure is reduced to about $5\times10^{-5}$ mm. of mercury and the filament 30 is energized in order to evaporate the material thereon. When the material has been evaporated and condensed to the desired thickness on the substrates 20, the current is shut off from the filament 30. All current supplies are then disconnected, the vacuum released and the coated substrates removed.

An emulsion film is applied to the coated substrate in a manner that produces a relatively even coating of emulsion on the metal film. This step may be carried out by placing a relatively large drop of emulsion on the article and placing the article on a wheel for spinning. The effect of the spinning spreads the emulsion over the article into a uniform layer. The emulsion is light hardened through a photographic mask by exposure to ultra violet light. The U.V. light hardens only that portion of the emullsion which is not covered by an opaque part of the mask. Subsequent to the light hardening step the unhardened emulsion may be removed from the film by washing with a solvent, such as, trichlorethylene.

The substrates 20 having the emulsion masks thereon are placed in the vacuum chamber and mounted on the metal support 16 in relatively close proximity to the electron ring 34. The substrates 20 are arranged with the emulsion coated metallic layer facing the ring 34. The chamber is evacuated to a pressure of about .03 micron and argon let in to raise the pressure to between 1/10 and 100 microns of mercury. Preferably the pressure is maintained at 10–20 microns of mercury during the electric discharge. The rectifier circuit 40 is energized so that a potential of about 3,000 to 5,000 volts is applied to the work holder 16. The work holder 16 is connected as an anode. The ring 34 is also energized so that electrons flow from the ring 34 and bombard the surface of the substrates 20.

Figure 3:
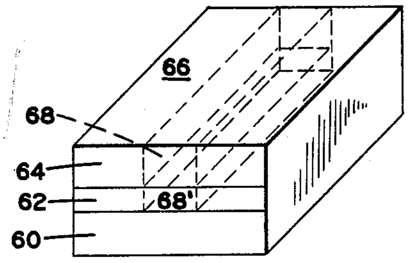
FIG. 3 is a somewhat schematic perspective view illustrating an article formed by the practice of the invention.

Referring now more particularly to FIG. 3 wherein a glass substrate 60 has a thin metal film 62 deposited thereon and an emulsion coating 64 placed on top of the metal film 62. The emulsion film 64 is light hardened in the portions designated by 66 and has an unhardened portion 68 running across the approximate center of the article. After the emulsion has been light hardened the area 68 is removed by washing in a solvent such as trichlorethylene. The assembly is then placed in a vacuum and the surface is exposed to an electric glow discharge which removes the metal from the uncovered area 68′. The metal film which is masked by the light hardened area 66 is unaffected. It has been found that this method removes only the preselected area and is effective to produce articles having relatively close tolerances.

Various modifications can be made without departing from the spirit or scope of the invention as pointed out in the appended claims.

What is claimed is:

1. A method of forming a reticle having a system of related predetermined shapes on a surface of a substrate comprising the step of vacuum depositing a film of iron nickel chromium alloy on the surface of the substrate, covering the surface of the substrate with a light reactive resist material, spinning the substrate to thereby spread the resist into a relatively uniform layer, light hardening portions of the resist by exposing selected portions of the resist material to ultraviolet light and removing the unhardened resist to form a mask covering the surface of the body excluding the preselected areas, placing the substrate relatively close to and between an anode and a source of electrons with the masked surface relatively close to the anode with respect to its distance from the electron source and facing the source of electrons, subjecting the masked substrate to a reduced pressure of between 10 and 20 microns of mercury, and subjecting the surface of said masked substrate to the action of an electric glow discharge having a potential of between 3,000 and 4,000 volts whereby the iron nickel chromium alloy is removed from the preselected areas leaving a system of related predetermined shapes on the surface of the substrate.

2. A method of forming a composite article including a substrate and a system of predetermined shapes on a surface of the substrate comprising the step of vacuum depositing a metal film on the surface of the substrate, removing a portion of the metal film excluding the predetermined shapes by coating the metal film with a light reactive resist material, drying the resist material and covering the material with a mask, hardening the preselected areas of the resist material by subjecting the uncovered areas to ultraviolet light, removing the mask and washing the substrate in a chemical bath to thereby remove the unhardened resist material, placing the substrate relatively close to an anode and between the anode and a source of electrons with the surface having the light hardened resist material thereon relatively close to the anode with respect to its distance from the source of electrons and facing the source of electrons, subjecting the masked substrate to atmospheric pressure in the range of 10–20 microns of mercury, and subjecting the surface of the masked substrate to the action of an electric glow discharge having a potential of between 3000–5000 volts whereby the metal film is removed from the areas which are not covered by light hardened resist leaving a system of related predetermined shapes on the surface of the substrate.

References Cited by the Examiner

UNITED STATES PATENTS

| | | | |
|---|---|---|---|
| 2,420,724 | 5/47 | Rice | 117—106 |
| 2,421,607 | 6/47 | Fowler | 204—143 |
| 2,447,836 | 8/48 | Beeber | 204—192 |
| 2,584,612 | 2/52 | Piety | 204—143 |
| 2,702,274 | 2/55 | Law | 204—192 |
| 2,877,338 | 3/59 | Berge | 204—192 |

(Other references on following page)

UNITED STATES PATENTS

| | | | |
|---|---|---|---|
| 2,923,624 | 2/60 | Hensler | 117—5.5 X |
| 3,046,176 | 7/62 | Bosenberg | 117—217 |
| 3,061,911 | 11/62 | Baker | 29—155.5 |
| 3,113,896 | 12/63 | Mann | 117—5.5 X |
| 3,118,050 | 1/64 | Hetherington | 250—49.5 X |

FOREIGN PATENTS

| | | |
|---|---|---|
| 754,101 | 8/56 | Great Britain. |
| 779,347 | 7/57 | Great Britain. |
| 812,713 | 4/59 | Great Britain. |

OTHER REFERENCES

Holland: Vacuum Deposition of Thin Films, 1956, pages 94–96, 439–443.

Chemical Abstracts, volume 49, 1955, page 10732.

J. Applied Physics, volume 20, pages 414–415, April 19, 1948.

JOHN H. MACK, *Primary Examiner.*

MURRAY TILLMAN, *Examiner.*